(12) United States Patent
Agarwal et al.

(10) Patent No.: US 10,277,743 B1
(45) Date of Patent: Apr. 30, 2019

(54) CONFIGURABLE NATURAL LANGUAGE CONTACT FLOW

(71) Applicant: Amazon Technologies, Inc., Seattle, WA (US)

(72) Inventors: Saket Agarwal, Redmond, WA (US); Joseph Daniel Sullivan, Seattle, WA (US); Pasquale DeMaio, Bellevue, WA (US); Jon Russell Jay, Mercer Island, WA (US); Jaswinder Singh Randhawa, Seattle, WA (US); Nihal Chand Jain, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/465,447

(22) Filed: Mar. 21, 2017

(51) Int. Cl.
| | |
|---|---|
| *H04M 3/51* | (2006.01) |
| *H04M 3/523* | (2006.01) |
| *G10L 15/18* | (2013.01) |
| *G06F 17/27* | (2006.01) |
| *G10L 15/22* | (2006.01) |

(52) U.S. Cl.
CPC ........ *H04M 3/523* (2013.01); *G06F 17/2785* (2013.01); *G10L 15/1815* (2013.01); *G10L 15/22* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 2015/0045003 A1* | 2/2015 | Vora ................... | H04M 1/64 455/412.2 |
| 2016/0063998 A1* | 3/2016 | Krishnamoorthy ..... | G10L 15/02 704/254 |
| 2018/0097940 A1* | 4/2018 | Beilis ................... | G06F 17/27 |
| 2018/0146089 A1* | 5/2018 | Rauenbuehler ... | H04M 3/42365 |

* cited by examiner

*Primary Examiner* — Harry S Hong
(74) *Attorney, Agent, or Firm* — Thorpe North & Western, LLP.

(57) ABSTRACT

A technology is described for configurable contact flows implemented using a contact flow service. An example method may include activating a contact flow in response to a request to establish a contact center session. The contact flow may be used to provide automated contact service communications to end users using computing resources hosted within a computing service provider environment. A starting prompt specified by the contact flow may be output using a communication channel. Input data may be received via the communication channel in response to the starting prompt. The input data may be analyzed to identify an intent identifier included in the input data and a contact flow action linked to the intent identifier may be executed.

20 Claims, 10 Drawing Sheets

CONFIGURABLE NATURAL LANGUAGE CONTACT FLOW

BACKGROUND

A call flow may define how a user initiated electronic communication (e.g., a phone call) received at a contact center platform may be handled from the moment the communication is received to the end of the communication. For example, a static call flow may present a user with a menu of options (e.g., press 1 for sales, press 2 for billing, etc.) that can be navigated to arrive at an answer sought by the user (e.g., get statement, connect to a customer service agent, etc.), or a dynamic call flow may receive natural language input from a user and analyze the input to determine an intent of the user and provide the user with an answer associated with the intent. An administrator of a contact center platform may define a call flow to handle simple to complex contact scenarios, and the call flow may be implemented using applications, scripting languages, and/or other technologies, which may be executed using the contact center computing platform.

DETAILED DESCRIPTION

Figure 1:
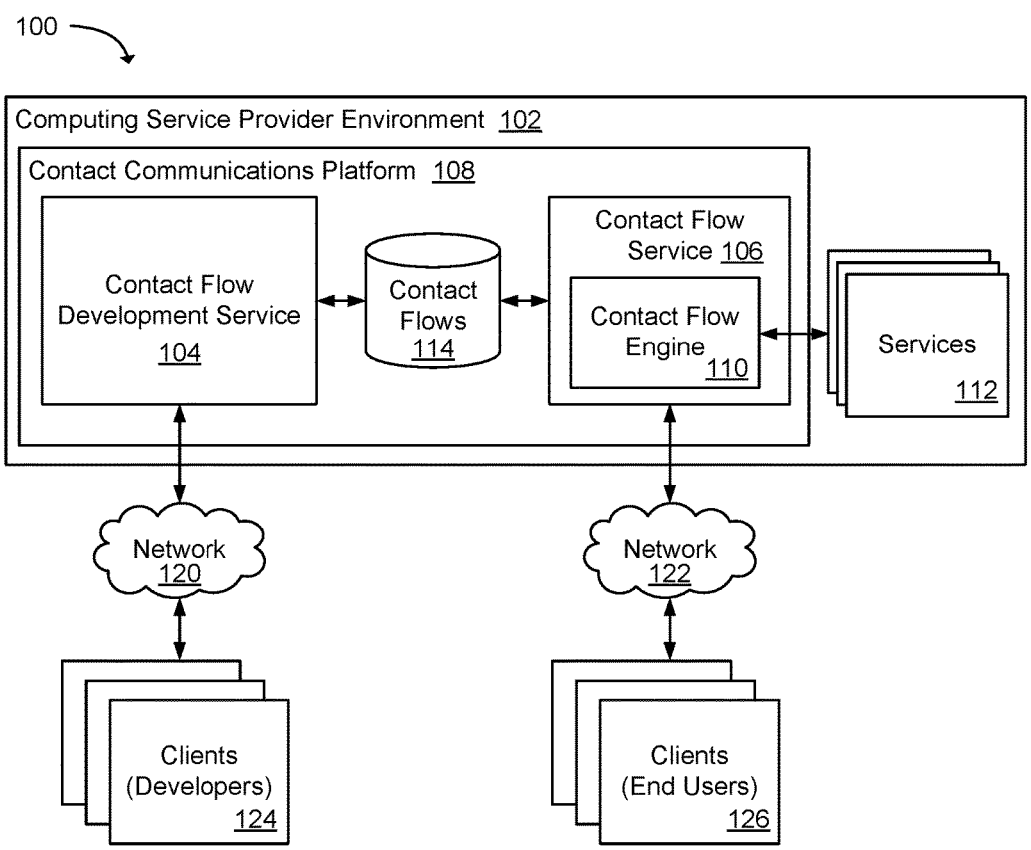
FIG. 1 is a block diagram illustrating an example system for a contact communications platform used by contact flow developers to develop and deploy contact flows.

A technology is described for constructing a contact flow and implementing the contact flow using a contact flow service hosted in a computing service provider environment. In one example, a contact flow may comprise a script or application configured to handle user initiated electronic communications that may include multi-turn dialogs (e.g., a question/answer dialog). For example, a contact flow may be configured to call services that execute contact flow components (e.g., natural language components, menu components, and action components) according to a defined communication flow that handles user communications that, for example, may include, but is not limited to: telephony, IVR (Interactive Voice Response), SMS (Short Message Service), MMS (Multimedia Message Service), instant message, chatbot, web page forms, email, and other forms of electronic communications with users.

Contact flow developers (e.g., customers of a computing service provider) may be provided with development tools that enable the contact flow developers to author a contact flow that, for example, includes natural language processing. The development tools may allow technically and non-technically skilled developers to visually arrange contact flow components and edit properties of the contact flow components to build a framework for automated contact service communications. As one example, a computing service provider may provide contact flow developers with a managed service (e.g., SaaS (Software as a Service)) configured to provide a contact flow service hosted on a contact communications platform.

In one example, contact flows may be developed using a contact flow development console configured to allow contact flow developers to graphically arrange and edit contact flow components included in a contact flow, and deploy the contact flow to the contact service communications platform configured to execute the contact flow in response to electronic communications received from users of the contact flow service. In another example, contact flows may be developed using a contact flow development interface that allows contact flow developers to construct a contact flow documents using a data interchange document format, such as, but not limited to, JSON (JavaScript Object Notation) or XML (eXtensible Markup Language).

In the past, contact flows were mainly developed by skilled technical administrators. As a result of the present technology, non-technical developers, such as business users who provide contact flow services via a contact center system to end users may construct contact flows that may be capable of handling complex contact scenarios. As an example, using a contact flow development console, a contact flow developer may build a contact flow by adding contact flow components (e.g., graphical control objects) to a contact flow container in a graphical form.

As an illustration, a contact flow developer may add a natural language component, which may be a type of contact flow component, to a contact flow container and configure the natural language component to provide a starting prompt that asks an end user a question (e.g., "How can I help you?"). The natural language component may be configured to analyze input data provided by the end user in response to the starting prompt for an intent identifier (e.g., a word or phrase used to describe a thing or to express a concept conveyed in a spoken utterance, through text, or a physical gesture), as well as input data retrieved from another system (e.g., user account system, ordering system, or incident tracking system) related to an end user (e.g., account number, order number, or incident tracking number). The intent identifier may be linked to a contact flow action that corresponds to the intent identifier, wherein the contact flow action may represent an action that is performed in response to the input data from a user (e.g., an instruction or command). As one example, an intent identifier for retrieving account information may be linked to a contact flow action that retrieves the account information from an account database. As another example, an intent identifier for talking to a contact service agent may be linked to a contact flow action to add an end user to a contact service agent queue.

A natural language component may be configured to interface with a natural language service that provides conversational interfaces using voice and text. For example, the natural language service may provide automatic speech recognition (ASR) functionalities for converting speech to text, and natural language understanding (NLU) used to recognize the intent of the text, enabling customers to build applications that provide conversational interactions. A natural language component may be configured to recognize a range of intent identifiers and each of the intent identifiers may be linked to a contact flow action. A contact flow developer may use a contact flow development console to build simple and/or complex contact flows comprising connected contact flow components and deploy the contact flow for use by end users.

To further describe the present technology, examples are now provided with reference to the figures. Accordingly, FIG. 1 is a block diagram illustrating a high level example of a system 100 for a contact communications platform 108 used by contact flow developers, who may be customers of a computing service provider, to develop and deploy contact flows 114. The contact flows may be configured to provide end users with, for example, automated contact service that utilizes multi-turn dialogs. The contact communications platform 108 may be hosted using computing resources included in a computing service provider environment 102. In one example, the computing resources used to host the contact communications platform 108 may be virtualized computing resources, as described in greater detail in association with FIG. 7.

Figure 3:
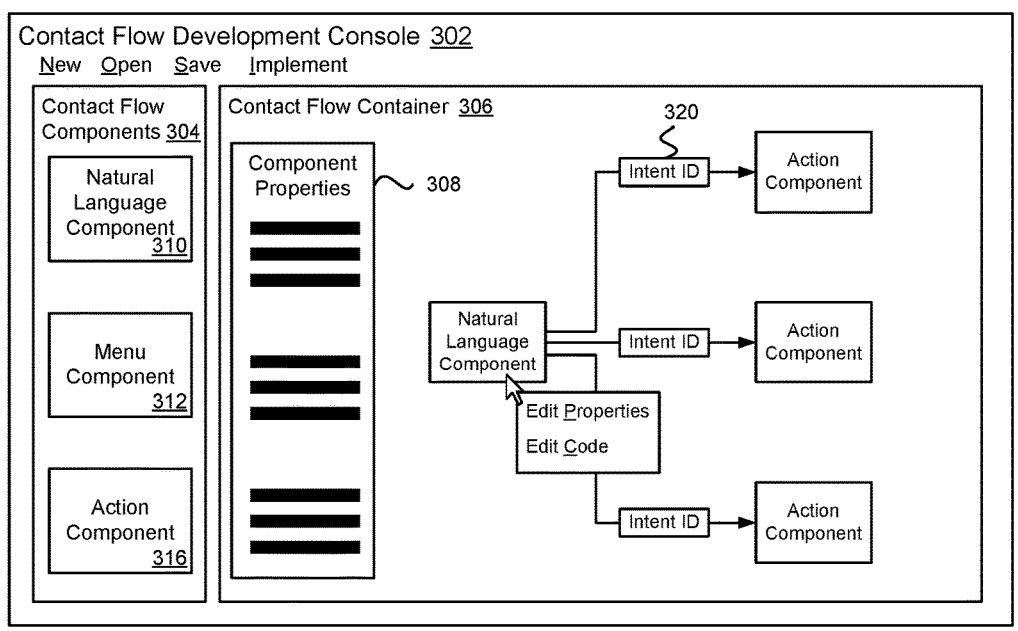
FIG. 3 is a diagram illustrating an example contact flow development console used to create and modify contact flows using graphically displayed contact flow components.

As illustrated, the contact communications platform 108 may include a contact flow development service 104 used in part to create and edit contact flows 114, and a contact flow service 106 used to implement or execute contact flows 114. In one example, the contact flow development service 104 may be configured to provide contact flow developers with a contact flow development console (e.g., a graphical user interface) used to create and edit contact flows. One example of a contact flow development console is shown in FIG. 3. Contact flow developers, via a client 124 (e.g., computer devices), may access development tools provided by the contact flow development service 104 and use the development tools to create contact flows 114. Contact flows 114 may include workflows, scripts, and/or applications configured to handle electronic communications received from end users via clients 126 (e.g., telephones and computer devices).

Illustratively, development tools provided by the contact flow development service 104 may include build automation tools configured to automate the creation of contact flows 114. For example, build automation tools may enable a contact flow developer to visually arrange and associate contact flow components within a contact flow container using graphically represented contact flow components. A contact flow container may provide the framework for a contact flow 114. For example, a contact flow container may comprise a script body having tags that define the structure of a contact flow 114 to which contact flow scripts may be added, or a contact flow container may comprise an application module to which contact flow modules may be added. The contact flow container may be graphically displayed within the contact flow development console and contact flow components, such as natural language components, menu components, action components, and the like may be visually placed (e.g., via drag and drop operations) within the contact flow container. Adding a contact flow component to the contact flow container may, for example, result in: updating a contact flow script to include executable instructions, update a contact flow script with a reference and parameters to executable instructions, or update a contact flow script to include a call to a service configured to perform the functions of the contact flow component.

As described in greater detail later, contact flow components added to a contact flow container may be customized by a contact flow developer. For example, a contact flow developer may configure contact flow components to: provide prompts, recognize specified intent identifiers, perform specified actions, provide menu options, etc. In as much, a contact flow developer may define a customized contact flow tree to handle user inquiries. Also, contact flow developers can update their contact flows using the development tools provided by the contact flow development service 104. For example, contact flow developers may add, remove, and/or replace contact flow components included in a contact flow 114 and redeploy the contact flow 114 to be implemented using the contact flow service 106. In one example, contact flow components may be preconfigured to call services 112 that perform functions, like analyzing natural language input, converting text to speech, placing a user session in a service agent queue, as well as other functions. As such, a contact flow developer may not need to specify a particular service 112 to utilize, or even be aware of which services 112 are used to execute the customer's contact flow 114.

Contact flows 114 created by contact flow developers may be implemented using the contact flow service 106. As illustrated, the contact flow service 106 may include a contact flow engine 110 and services 112 (e.g., a natural language service, machine learning service, serverless compute service, etc.) used by the contact flow service 106 to execute contact flows 114. The contact flow service 106 may be accessible to end users via clients 126. For example, an end user, via a telephone or computer device, may initiate an electronic communication with the contact flow service 106 in order to receive contact service. In one example, one or more dedicated communication channels, such as a telephony communication channel or HTTP (Hypertext Transfer Protocol) communication channel, may be assigned to, or selected by a contact flow developer, for use in association with the customer's contact flow 114. The dedicated communication channel may be used by end users to establish a session with the customer's contact flow service 106 and receive services provided by the contact flow service 106 via the contact flow 114.

In response to establishing a session with a client 126, the contact flow service 106 may invoke a contact flow 114 using a contact flow engine 110. In one example, as explained in greater detail later in association with FIG. 5, the contact flow engine 110 may be configured to invoke a contact flow 114 and call services 112 referenced by the contact flow 114. For example, a contact flow 114 may be a workflow, script, or application that includes contact flow components defining a contact flow tree. The contact flow engine 110 may execute an initial or starting contact flow component and execute subsequent contact flow components as determined by input data received from an end user via a client 126. A contact flow component may include one or more calls to services 112, such that when executed by the contact flow engine 110, a call may be made to a service 112 as specified by the contact flow component.

As a non-limiting example, an end user may connect to a contact flow service 106 using a telephony communication channel (e.g., telephone circuit or VoIP (Voice over Internet Protocol)) assigned to an instance of the contact flow service 106 configured to execute a contact flow 114. After establishing a session with the contact flow service 106, the contact flow engine 110 may be instructed to invoke the contact flow 114, which includes a number of contact flow components. The contact flow 114 may include a natural language component configured to provide an end user with a starting prompt (e.g., "What can I do for you"). The contact flow engine 110 may execute the natural language component, and in doing so, a call to a service 112 configured to generate the initial prompt may be made. For example, in executing the natural language component, the contact flow engine 110 may be configured to call a text-to-speech service that converts a starting prompt textual message (e.g., "What can I do for you") to audio data that may sent to the end user via the telephony communication channel.

In response to receiving the starting prompt, the end user may provide input data, which may include a spoken utterance. The natural language component may be configured to handle the input data by calling a natural language service, which analyzes the input data for an intent identifier expressed by an end user and returns the intent identifier to the natural language component. A contact flow developer may configure the natural language component to recognize one or more intent identifiers linked to actions. Accordingly, the intent identifier returned by the natural language service may be matched with a contact flow action and thereafter, the contact flow action may be executed. Execution of the contact flow 114 may continue until, for example, an end user is presented with sought after information (e.g., user account information), a terminal contact flow action is executed (e.g., product purchase), or the end user terminates communication with the contact flow service 106.

In some examples, transaction data associated with a contact flow 114 may be collected over time and the transaction data may be analyzed to identify improvements to the configuration of the contact flow 114 and the contact flow 114 may be updated accordingly. For example, contact flow developers may update existing contact flows 114 to better handle end user inquiries. As an illustration, analysis of transaction data for a contact flow 114 may indicate that the contact flow 114 is not configured to handle a particular end user inquiry that is often made by end users. A contact flow developer may update the contact flow 114 to handle the end user inquiry and redeploy the contact flow 114 for use by end users.

Contact flow developers may utilize clients 124 to access the contact flow development service 104. A client 124 may comprise, for example a processor-based system such as a computing device. A client 124 may be a device such as, but not limited to, a desktop computer, laptop or notebook computer, tablet computer, mainframe computer system, handheld computer, workstation, network computer, or other devices with like capability. End users of a contact flow service 106 may utilize clients 126 to access the contact flow service 106. A client 126 may include a telecommunications device that converts sound into electronic signals suitable for transmission over telecommunication cables or other transmission media, including VoIP (Voice over Internet Protocol), or a client 126 may include a computing device as described above.

The various processes and/or other functionality contained within the system 100 may be executed on one or more processors that are in communication with one or more memory modules. The system 100 may include a number of computing devices that are arranged, for example, in one or more server banks or computer banks or other arrangements. The computing devices may support a computing environment using hypervisors, virtual machine monitors (VMMs) and other virtualization software. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to modules and services included in the computing service provider environment 102 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The networks 120/122 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

Services hosted in the computing service environment 102 may be centrally hosted functionality or a service application may receive requests and provide output to other services or consumer devices. For example, services may be considered on-demand computing that are hosted in a server, virtualized service environment, grid or cluster computing system. An API may be provided for each service to enable a second service to send requests to and receive output from the first service. Such APIs may also allow third parties to interface with the service and make requests and receive output from the services. While FIG. 1 illustrates an example of a system that may implement the techniques above, many other similar or different environments are possible. The example environments discussed and illustrated herein are merely representative and not limiting.

Figure 2:
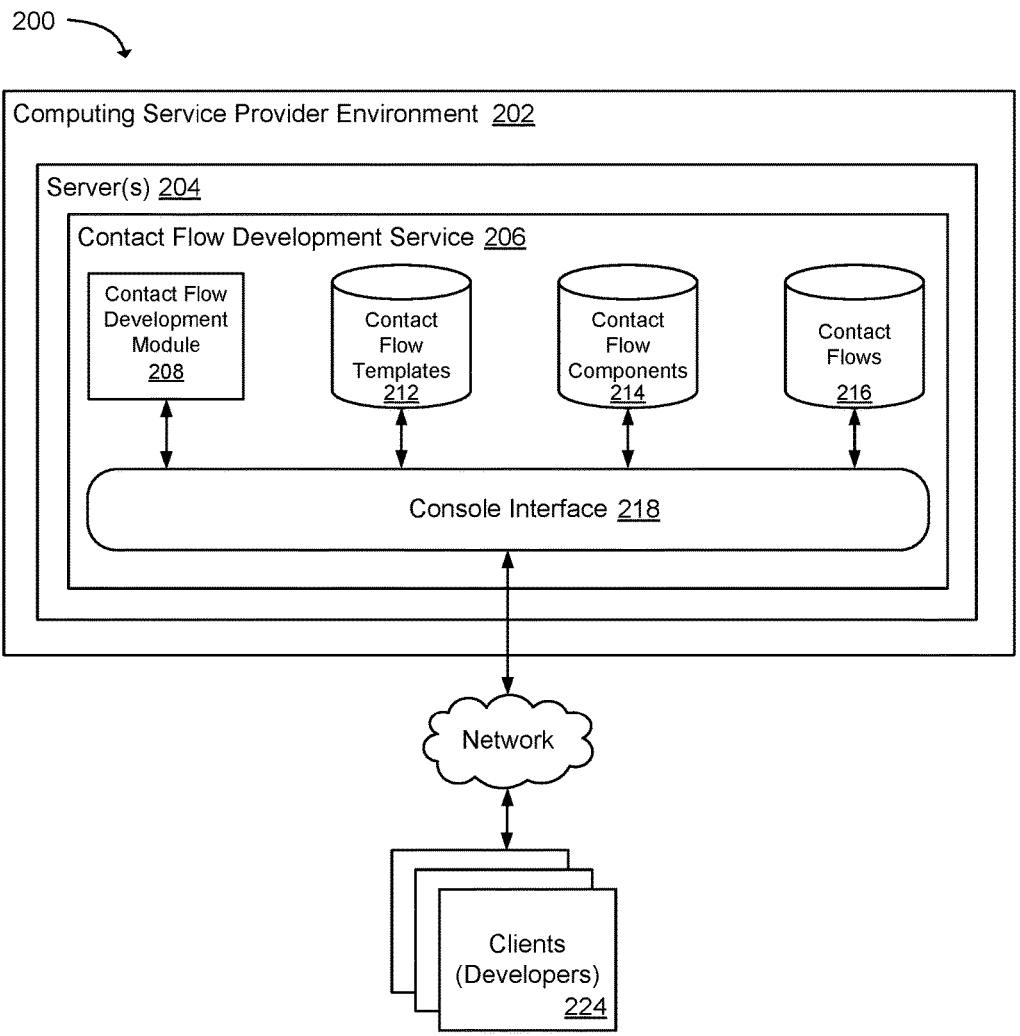
FIG. 2 is a block diagram that illustrates components of an example system for a contact flow development service.

FIG. 2 is a block diagram illustrating components of an example system 200 for a contact flow development service 206. The contact flow development service 206 may be provided to contact flow developers who may be customers of computing service provider. The contact flow development service 206 may be used to create and manage contact flows 216 implemented using the contact flow service described earlier. As illustrated, one or more servers 204 included in a computing service provider environment 202 may host the contact flow development service 206. The contact flow development service 206 may include a console interface 218 configured to provide a contact flow developer with an interface to development tools used to create and manage contact flows 216 as accessed via a client 224.

In one example, development tools available via the console interface 218 may include a contact flow development module 208, contact flow templates 212, and contact flow components 214. The contact flow development module 208 may be configured to provide a development environment used to create and modify contact flows 216. One example of a development environment is illustrated in FIG. 3. In one example, the contact flow development module 208 may include build automation tools that may be used to automate the creation and editing of contact flows 216. The build automation tools may automate the creation of scripts and/or applications that comprise a contact flow 216. For example, a contact flow container for a contact flow 216 may be visually represented in the development environment. A contact flow developer may arrange visually represented contact flow components 214 within the contact flow container and create/set/modify parameters for the contact flow components 214 in order to build a framework for automated contact service. In building the contact flow 216, the build automation tools may generate computer source code for the contact flow container and contact flow components 214 visually represented in the development environment.

The contact flow components 214 may be preconfigured with default parameter settings allowing for a contact flow component 214 to be used in a contact flow 216 with little or no modification of parameter settings for the contact flow component 214. In as much, contact flow developers lacking technical skills to modify the source code of a contact flow component 214 may build a contact flow 216 by selecting a contact flow component 214 for inclusion in the contact flow 216 and either retain the default parameter settings, or make minor parameter setting modifications using a graphical menu, for example. However, contact flow developers having the skills to make advanced modifications to contact flow components 214 may, for example, use a source code editor to customize the source code of a contact flow component 214 to the customer's specifications.

In one example, contact flow templates 212 may be used to provide contact flow developers with a starting point in building contact flows 216. A contact flow template 212 may include a contact flow container and preconfigured contact flow components 214. A contact flow developer may select a contact flow template 212 from a collection of contact flow templates 212 directed to different areas of contact flow services, and customize the contact flow template 212 for use in the customer's contact flow service. As a specific example, a contact flow developer that operates a retail store may select a contact flow template 212 preconfigured to handle retail store customer service. The contact flow template 212 may include a natural language component that the contact flow developer may modify according to the customer's needs. Also, the contact flow developer may expand on the contact flow template 212 by adding additional contact flow components 214 to the contact flow template 212 and/or swap out contact flow components 214 as needed.

FIG. 3 is a diagram illustrating an example of a contact flow development console 302 that may be used to create and modify contact flows using graphically displayed contact flow components 304. The contact flow development console 302 may provide a contact flow developer with a development environment used to add, remove, arrange, and configure contact flow components 304 within a contact flow container 306. As shown, contact flow components 304 may include, but are not limited to, menu components 312, natural language components 310, and action components 316.

A contact flow developer may modify properties (e.g., prompts, intent identifiers, actions, etc.) of the contact flow components 304 using tools provided by the contact flow development console 302, or instead, a contact flow developer may retain default properties of the contact flow components 304. In one example, the contact flow development console 302 may comprise an integrated development environment that provides build automation tools, a source code editor and properties editor 308, and in some examples, debugging utilities. In as much, contact flow developers having advanced technical skills may modify the source code of a contact flow component 304 or create a new contact flow component 304 using a source code editor.

A natural language component 310 may be configured to prompt an end user to provide an intent (i.e., an instruction conveyed in a spoken utterance, through text, or physical gesture). For example, a prompt may be configured to ask an end user a question, like "How can I help you" or "Please tell me what I can do for you" via a voice message or textual message. An end user may express an intent using a method indicated by a prompt (e.g., spoken utterance, text, or physical gesture). A response expressed by an end user may be provided as input data, which may be analyzed for an intent identifier. For example, a spoken utterance may be converted to audio data. The natural language component 310 may be configured to analyze input data to identify an intent identifier 320 expressed by an end user and match the intent identifier 320 with an action defined using an action component 316. For example, the natural language component 310 may process audio data by extracting terms and phrases that express an intent uttered by an end user and match the terms or phrases to an intent identifier 320.

In one example, the natural language component 310 may be configured to provide input data provided in response to a prompt to a natural language service (shown in FIG. 5), which may be used to analyze input data for an intent identifier 320. A contact flow developer may configure a natural language component 310 to recognize one or more intent identifiers 320, and/or the natural language component 310 may be preconfigured to recognize and handle predefined intent identifiers 320. In an example where a contact flow developer configures a natural language component 310 to recognize one or more intent identifiers 320, the contact flow developer may specify an intent identifier 320 and match the intent identifier 320 to an action defined by an action component 316. As a specific example, a contact flow developer may configure a natural language component to recognize that an end user is asking for account information, asking to order a product, or asking to speak to a contact service agent.

A contact flow developer may configure the natural language component 310 by providing keywords and/or phrases and linking the keywords and/or phrase to actions. As a specific example, the phrase "Please give me my account information" may be linked to an action component 316 configured to retrieve an end user's account information from an account database. In one example, in addition to defining intent identifiers 320 recognized by a natural language component 310, the natural language component 310 may be configured to execute an exception action when an intent identifier 320 cannot be determined. For example, an exception action may prompt an end user to state restate an intent when an intent identifier 320 cannot be determine, or an exception action may provide an end user with an error message when an intent identifier 320 cannot be determined. In another example, a natural language component 310 may be configured to dynamically identify an intent identifier 320 included in input data and link the intent identifier 320 to an action component 316. In some examples, machine learning may be used by a natural language component 310 to identify an intent identifier 320 included in input data provided by an end user. Examples of machine learning that may be used may include, but are not limited to, statistical machine learning, decision trees, Bayesian models, neural network models, and the like.

A menu component 312 may present an end user with a menu of available options that the end user may select from. For example, a menu component 312 may provide via a voice message or a textual message that lists options, such as "say or press 1 for account information", "say or press 2 to speak to an agent", and the like. An end user may provide an intent by selecting an option using a method indicated by the menu component 312 (e.g., saying or pressing 1) and a contact flow action represented by an action component 316 linked to an intent identifier 320 representing the user's intent may be executed.

An action component 316 may be configured to execute a contact flow action linked to an intent identifier 320 defined using a natural language component 310 or menu component 312. A contact flow developer may configure an action component 316 to perform a contact flow action. For example, an action component 316 may be configured to perform contact flow actions that include, but are not limited to, retrieving information from a database, executing a transaction, placing an end user communication in a contact service agent queue, prompting an end user with an intermediary question that further refines an intent, and the like. Action components 316 may be linked to intent identifiers 320 defined using natural language components 310 or menu components 312.

The contact flow development console 302 may provide a contact flow developer with a contact flow container 306 representing a basic framework for a contact flow. The contact flow developer may select contact flow components 304 (e.g., using a drag and drop operation) and place the contact flow components 304 in the contact flow container 306. A contact flow may contain any combination of contact flow components 304, and some contact flow components 304 may be exchanged with other contact flow components 304. As an example, a menu component 312 may be exchanged with a natural language component 310. The contact flow components 304 may be linked to one another. For example, one or more action components 316 may be linked to a natural language component 310 via intent identifiers 320 defined by the natural language component 310. As such, a contact flow tree may be developed by adding contact flow components 304 to a contact flow container 306 and linking the contact flow components 304 to one another to form a workflow for automated contact service implemented using the contact flow service described herein.

Figure 4:
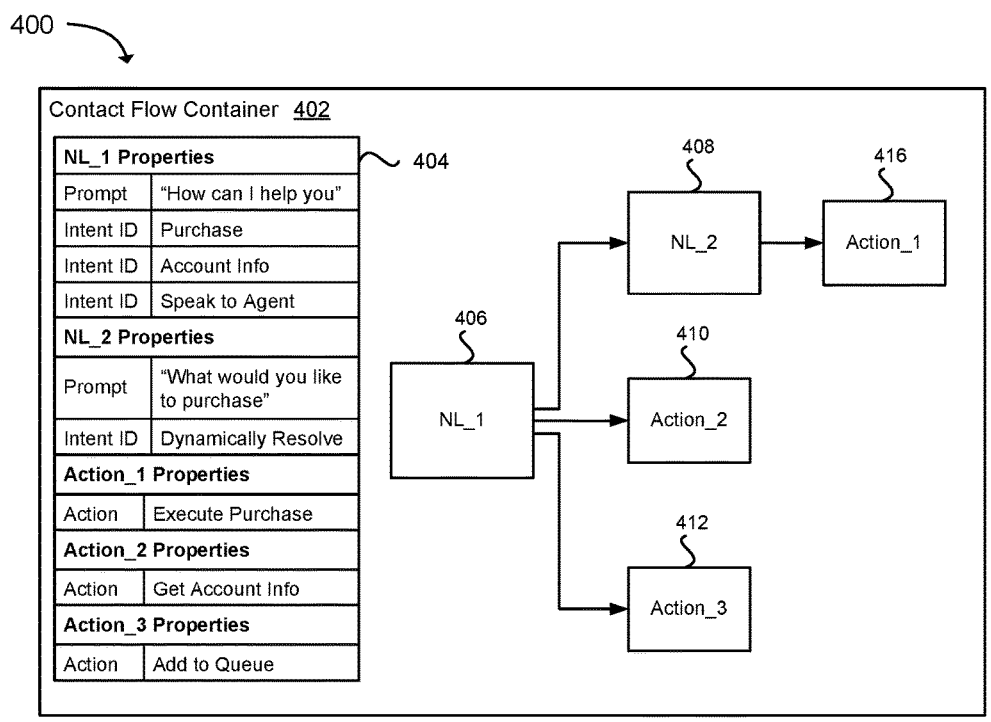
FIG. 4 is a diagram illustrating a specific example of a contact flow that may be developed using a contact flow development console.

FIG. 4 is a diagram illustrating a specific example of a contact flow 400 that may be developed using a contact flow development console. The illustrated contact flow 400 may be configured to provide customer service to retail customers of a retail store. The contact flow 400 includes a contact flow container 402 providing an expandable framework for the contact flow 400 and a number of contact flow components having properties that may be set using a properties editor 404.

A first natural language component 406 may be configured to provide an end user with a starting prompt via a voice or textual message asking the end user to provide an intent by way of a spoken utterance or textual message. The first natural language component 406 may be configured to handle input data (e.g., voice data or text data) generated in response to the starting prompt by causing the input data to be analyzed for an intent identifier that represents the intent expressed by the end user. For example, the first natural language component 406 may be configured to call a natural language service as described in association with FIG. 5. As illustrated, the first natural language component 406 may be configured to define an intent identifier to make a purchase, an intent identifier to receive account information, or an intent identifier to speak to a customer service agent.

The intent identifier to make a purchase defined in the first natural language component 406 may be linked to a second natural language component 408 configured to provide an end user with an intermediary prompt configured to ask the end user a follow up question that further refines the end user's purchase intent (e.g., "Please tell me the item you want to purchase"). The second natural language component 408 may be configured to dynamically determine the end user's purchase intent. For example, input data generated based on an end user's response to the intermediary prompt may be analyzed to determine an item that the end user would like to purchase (e.g., using machine learning) and information for the item may be provided to an action component 416 configured to execute the purchase of the item.

The intent identifier to receive account information defined in the first natural language component 406 may be linked to an action component 410 configured to obtain account information from an account database. The intent identifier to speak to an agent defined in the first natural language component 406 may be linked to an action component 412 configured to add the end user to a waiting queue to talk to a customer service agent. The contact flow 400 illustrated in FIG. 4 is merely one example of a contact flow that may be developed using a contact flow development console, and is therefore not meant to be limiting.

Figure 5:
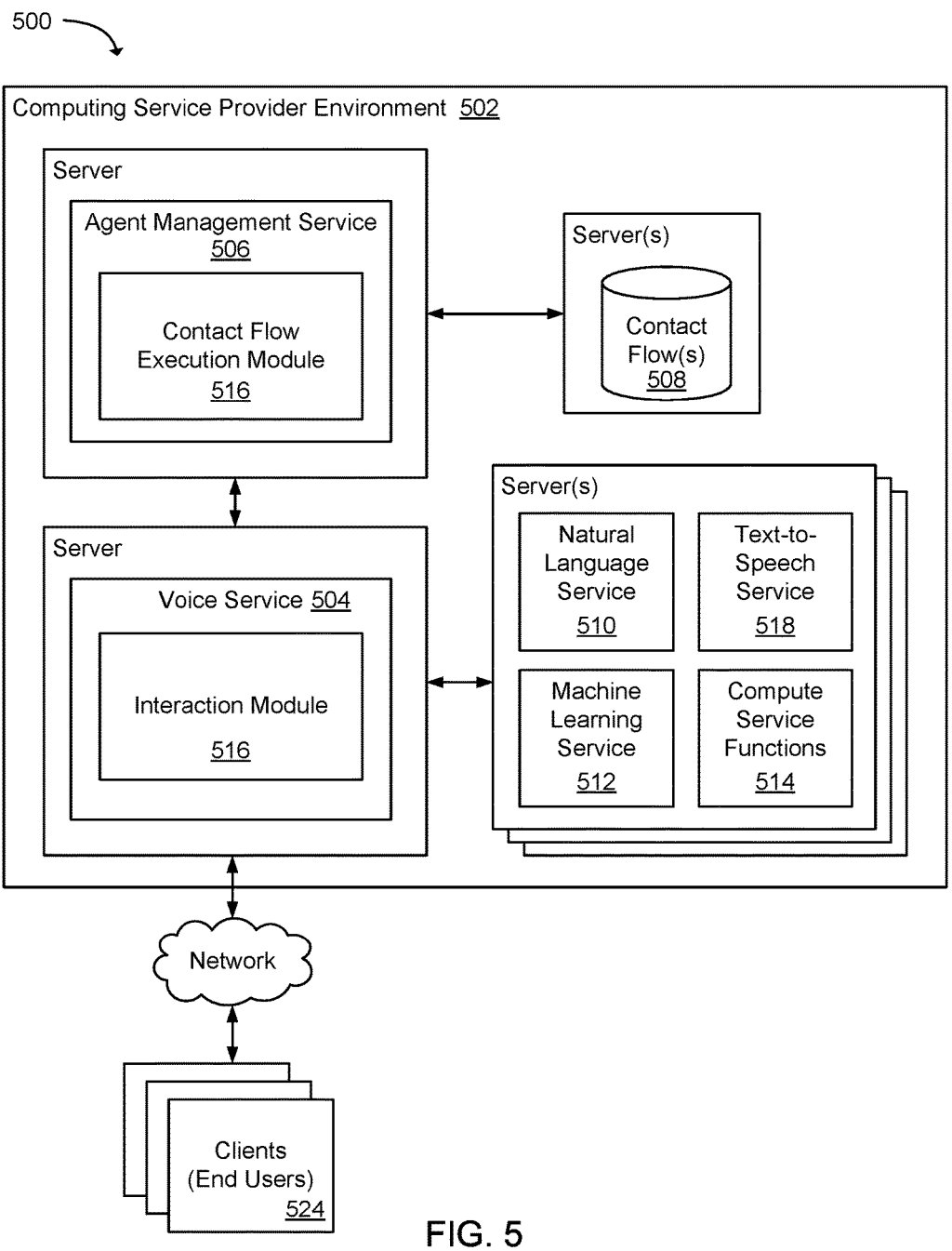
FIG. 5 is a block diagram that illustrates an example system for a contact flow service.

FIG. 5 is a block diagram that illustrates an example system 500 for implementing a contact flow 508. The system 500 may include servers included in a computing service environment 502 that host a voice service 504 and an agent management service 506. The voice service 504 (e.g., an automatic call distribution service) may be configured to receive contact service requests and provide automated contact services to end users via a contact flow 508 executed by the agent management service 506. Customers of a computing service provider may develop contact flows 508 as described earlier and implement the contact flows 508 using the voice service 504 and the agent management service 506. Clients 524 may be in communication with the voice service 504 via a communications channel that may include telephony, IVR, SMS, instant message, chatbot, email, or other communications channel used by a client 524.

In one example, the voice service 504 may include an interaction module 516 configured to handle communications received from clients 524. For example, a client 524 may initiate an electronic communication by sending a message to the voice service 504 using a communications channel (e.g., telephony or URL (Uniform Resource Locator)). In response to receiving the electronic communication, the voice service 504, via the interaction module 516, may request that the agent management service 506 invoke a contact flow 508 associated with the electronic communication using the contact flow execution module 516. The contact flow execution module 516 may execute contact flow components included in the contact flow 508. As described earlier, a contact flow 508 may be a script or application that includes contact flow components defining a contact flow tree. The contact flow execution module 516 may execute a starting contact flow component and execute subsequent contact flow components as determined by input data received from a client 524. As part of executing a contact flow 508, various services may be called to perform functions associated with a particular communication with a client 524. The services may include, but are not limited to, a natural language service 510, a text-to-speech service 514, a machine learning service 512, and compute service functions 514.

In one example, the natural language service 510 may be configured to provide conversational interfaces using voice and text. The natural language service 510 may provide automatic speech recognition (ASR) functionalities for converting speech to text, and natural language understanding (NLU) used to recognize the intent of the text, enabling customers to build applications that provide conversational interactions with clients 524.

The text-to-speech service 518 may be configured to convert text into synthesized speech. Customers may use the text-to-speech service 514 to create speech interfaces that can be called as part of executing a contact flow 508. Illustratively, the text-to-speech service 514 may provide speech synthetization using various voices and languages.

The machine learning service 512 may be configured to analyze input data using a machine learning model and return metadata matched to an action that corresponds to an intent identifier. Different classes of machine leaning may be used to analyze input data. For example, decision trees and statistical models (e.g., stochastic grammar, statistical parsing, data-oriented parsing, hidden Markov model, or estimation theory) may be used.

The compute service functions 514 may be used to analyze input data provided in association with a client 524. Input data may be provided by a client 524, or input data may be associated with a client 524 (e.g., account number, purchase number, etc.). For example, a compute service function 514 may be developed to analyze input data and match an intent identifier indicated in the input data to a corresponding action, or the compute service function 514 may return metadata to the contact flow execution module 516 and the metadata may be matched to an action.

As an illustration of a client interaction with the system 500, a client 524 may initiate a communication with the voice service 504, whereupon the voice service 504 may request that the agent management service 506 execute a contact flow 508 associated with the communication from the client 524. The contact flow 508 may be retrieved and the contact flow execution module 516 may execute a starting contact flow component included in the contact flow 508 that sends a client 524 a message asking for an instruction to perform an action. The message may be sent using a communications channel specified by the client 524. In response to the message, the client 524 may provide input data to the agent management service 506. The input data may be analyzed to determine an intent identifier expressed in the input data. For example, audio data generated from a spoken utterance may be analyzed to determine an intent identifier representing an intent of an end user. A service may be used to analyze the input data for the intent identifier.

In one example, the input data may be provided to the natural language service 510 to analyze the input data for an intent identifier and the natural language service 510 may return metadata to the contact flow execution module 516 and the metadata may be matched to an action defined in contact flow component. For example, the natural language service 510 may be configured to analyze audio or textual data using a natural language technique that may use any of: machine translation, coreference resolution, discourse analysis, morphological segmentation, named entity recognition, natural language generation and understanding, part-of-speech tagging, parsing, relationship extraction, sentiment analysis, speech recognition, speech segmentation, topic segmentation, etc.

In another example, input data may be provided to the machine learning service 512 to analyze the input data using a machine learning model and return metadata that may be matched to an action that corresponds to an intent identifier. In yet another example, a compute service function 514 may be used to analyze input data provided by a client 524. The compute service function 514 may be launched or invoked by the contact flow execution module 516. A compute service function 514 may execute on a managed compute service function platform provided by a computing service provider. The compute service function 514 may be submitted for execution without having to specify any particular server used to host the compute service function 514.

In one example, computing resources (e.g., servers and computing instances) used to implement the agent management service 506 may be scaled according to user demand for one or more contact flows 508. For example, the computing resources for the agent management service 506 may be increased or decreased according to a number of contact center sessions that are being handled by the agent management service 506.

In another example, the system may collect transaction data associated with invoking contact flows 508. The transaction data may include information associated with contact flow performance. As one example, transaction data may include information associated with an end user terminating a contact center session prior to a final action being performed (e.g., an end user terminates a session before being provided account information). As another example, transaction data may include information about whether an end user's intent was determined (e.g., an end user is repeatedly provided with a message indicating that the end user's intent cannot be determined). The transaction data may be analyzed to identify improvements that a contact flow developer can make to the configuration of the contact flow developer's contact flow.

Figure 6:
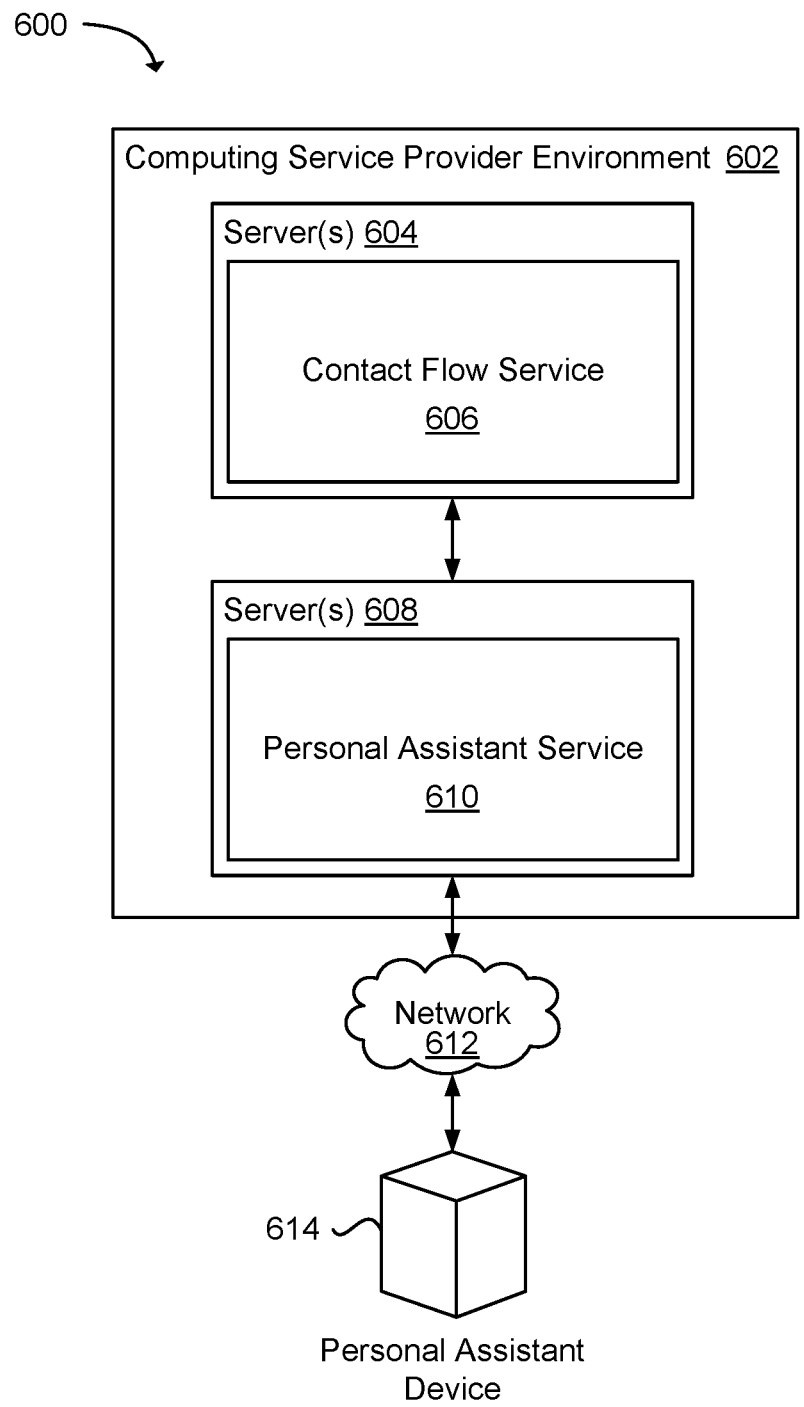
FIG. 6 is a block diagram illustrating an example system used to provide contact services defined by a contact flow by way of a personal assistant device.

FIG. 6 is a block diagram that illustrates an example system 600 used to provide contact services defined by a contact flow by way of a personal assistant device 614. The system may include a contact flow service 606 and a personal assistant service 610 hosted on servers 604/608 included in a computing service environment 602. The personal assistant service 610 may be communicatively coupled to a personal assistant device 614 and the contact flow service 606 via one or more APIs. A personal assistant device 614 may include dedicated computing devices designed to communicate with the personal assistant service 610, as well as other computing devices configured to connect to the personal assistant service 610 via software installed on the computing devices.

A personal assistant device 614 may be configured to connect to the personal assistant service 610 by way of a network 612 to obtain information requested by an end user of the personal assistant device 614. The personal assistant service 610 may invoke a software agent that may perform tasks or services for an end user in response to a request made using the personal assistant device 614. The tasks or services may be based on end user input, location awareness, and/or the ability to access information from a variety of online sources, such as weather, traffic conditions, news, stock prices, user schedules, retail prices, etc. In addition, an end user may initiate a contact center session using a personal assistant device 614. For example, an end user may request that the personal assistant service 610 (via a personal assistant device 614) connect to the contact flow service 606 and the contact flow service 606 may invoke a contact flow associated with the request.

Computing service customers may develop contact flows that may be invoked using a personal assistant device 614. Computing service customers may be provided with an API endpoint (or URL) for the contact flow service 606. The computing service customers can develop applications that call the API endpoint and request that the contact flow service 606 invoke the computing service customer's contact flow. For example, application developers can develop applications using a contact flow service SDK (Software Development Kit) that allows the applications can call the contact flow service 606 using an endpoint for the contact flow service 606, and in response to receiving a call, the contact flow service 606 retrieves a contact flow specified in the call. As a specific example, a financial institution (e.g., bank) may develop a contact flow using the development tools described earlier and the contact flow may be implemented using the contact flow service 606. An end user of a personal assistant device 614 may request that the personal assistant service 610 obtain the end user's bank account information. In response, the personal assistant service 610 may provide the contact flow service 606 with personal identifying information for the end user and request that the contact flow service 606 invoke the financial institution's contact flow, wherein the end user may then interact with the contact flow service 606 to obtain the end user's bank account information.

Figure 7:
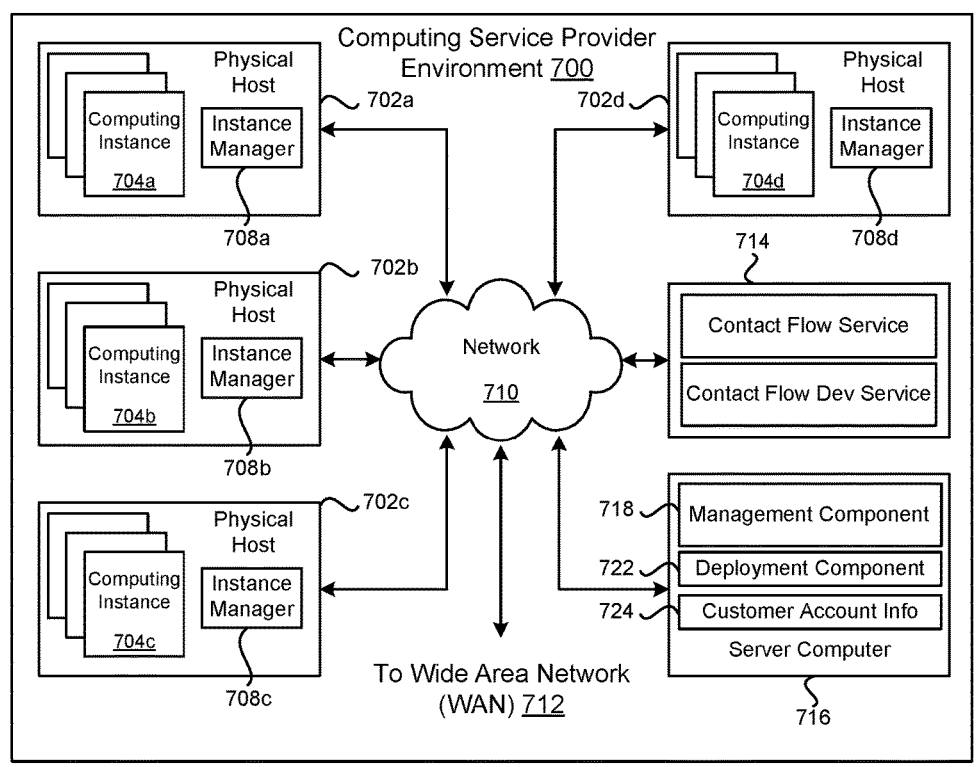
FIG. 7 is a block diagram that illustrates an example computing service environment that includes a contact flow development service and contact flow service.

FIG. 7 is a block diagram illustrating an example computing service provider environment 700 that may be used to execute and manage a number of computing instances 704*a-d*. In particular, the computing service provider environment 700 depicted illustrates one environment in which the technology described herein may be used. The computing service provider environment 700 may be one type of environment that includes various virtualized service resources that may be used, for instance, to host computing instances 704*a-d*.

The computing service provider environment 700 may be capable of delivery of computing, storage, and networking capacity as a software service to a community of end recipients. In one example, the computing service provider environment 700 may be established for an organization by or on behalf of the organization. That is, the computing service provider environment 700 may offer a "private cloud environment." In another example, the computing service provider environment 700 may support a multi-tenant environment, wherein a plurality of customers may operate independently (i.e., a public cloud environment). Generally speaking, the computing service provider environment 700 may provide the following models: Infrastructure as a Service ("IaaS"), Platform as a Service ("PaaS"), and/or Software as a Service ("SaaS"). Other models may be provided. For the IaaS model, the computing service provider environment 700 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service provider environment 700. End customers may access the computing service provider environment 700 using networked client devices, such as desktop computers, laptops, tablets, smartphones, etc. running web browsers or other lightweight client applications, for example. Those familiar with the art will recognize that the computing service provider environment 700 may be described as a "cloud" environment.

The particularly illustrated computing service provider environment 700 may include a plurality of server computers 702*a-d*. While four server computers are shown, any number may be used, and large data centers may include thousands of server computers. The computing service provider environment 700 may provide computing resources for executing computing instances 704*a-d*. Computing instances 704*a-d* may, for example, be virtual machines. A virtual machine may be an instance of a software implementation of a machine (i.e. a computer) that executes applications like a physical machine. In the example of a virtual machine, each of the server computers 702*a-d* may be configured to execute an instance manager 708*a-d* capable of executing the instances. The instance manager 708*a-d* may be a hypervisor, virtual machine monitor (VMM), or another type of program configured to enable the execution of multiple computing instances 704*a-d* on a single server. Additionally, each of the computing instances 704*a-d* may be configured to execute one or more applications.

One or more server computers 714 and 716 may be reserved to execute software components for managing the operation of the computing service provider environment 700 and the computing instances 704*a-d*. For example, a server computer 714 may execute a contact flow service and a contact flow development service as described earlier. The contact flow service and the contact flow development service may be executed using one or more physical hosts, computing instances, or a combination thereof.

A server computer 716 may execute a management component 718. A customer may access the management component 718 to configure various aspects of the operation of the computing instances 704*a-d* purchased by a customer. For example, the customer may setup computing instances 704*a-d* and make changes to the configuration of the computing instances 704*a-d*.

A deployment component 722 may be used to assist customers in the deployment of computing instances 704*a-d*. The deployment component 722 may have access to account information associated with the computing instances 704*a-d*, such as the name of an owner of the account, credit card information, country of the owner, etc. The deployment component 722 may receive a configuration from a customer that includes data describing how computing instances 704*a-d* may be configured. For example, the configuration may include an operating system, provide one or more applications to be installed in computing instances 704*a-d*, provide scripts and/or other types of code to be executed for configuring computing instances 704*a-d*, provide cache logic specifying how an application cache should be prepared, and other types of information. The deployment component 722 may utilize the customer-provided configuration and cache logic to configure, prime, and launch computing instances 704*a-d*. The configuration, cache logic, and other information may be specified by a customer accessing the management component 718 or by providing this information directly to the deployment component 722.

Customer account information 724 may include any desired information associated with a customer of the multi-tenant environment. For example, the customer account information may include a unique identifier for a customer, a customer address, billing information, licensing information, customization parameters for launching instances, scheduling information, etc. As described above, the customer account information 724 may also include security information used in encryption of asynchronous responses to API requests. By "asynchronous" it is meant that the API response may be made at any time after the initial request and with a different network connection.

A network 710 may be utilized to interconnect the computing service provider environment 700 and the server computers 702*a-d*, 716. The network 710 may be a local area network (LAN) and may be connected to a Wide Area Network (WAN) 712 or the Internet, so that end customers may access the computing service provider environment 700. The network topology illustrated in FIG. 7 has been simplified, many more networks and networking devices may be utilized to interconnect the various computing systems disclosed herein.

Figure 8:
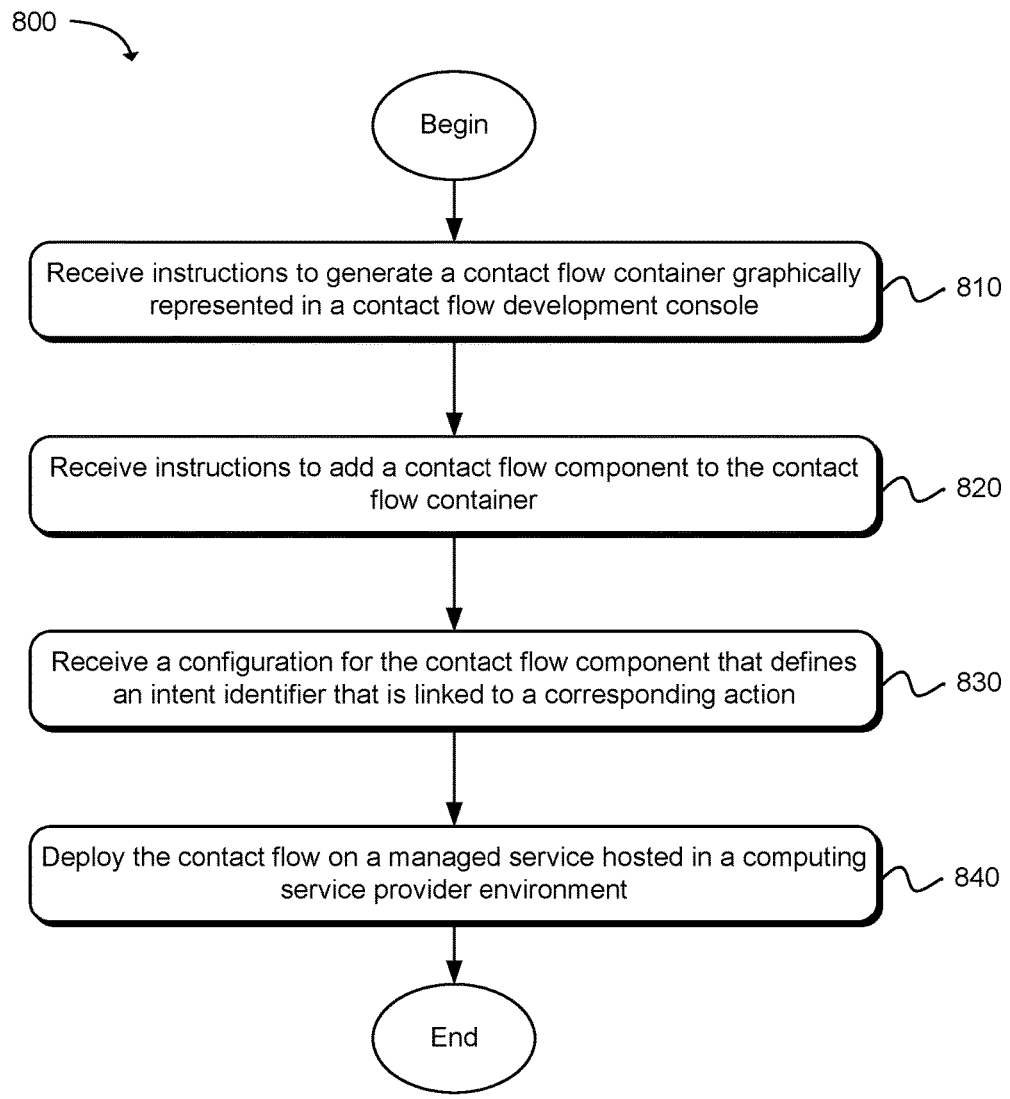
FIG. 8 is a flow diagram illustrating an example method for developing a contact flow using a contact flow development console.

FIG. 8 is a flow diagram illustrating an example method 800 for developing a contact flow using a contact flow development console. The contact flow development console may provide customers of a computing service provider with development tools that allows the customers to create and modify contact flows by arranging contact flow components within a contact flow container and configure the contact flow components. A contact flow container and contact flow components may form a contact flow and provide a framework for automated contact service communications. The contact flow may be executed using computing resources hosted in a computing service provider environment.

As part of creating a contact flow, a contact flow development service may, as in block 810, receive instructions to generate a contact flow container graphically represented in a contact flow development console. FIG. 3 illustrates one example of a contact flow development console that may be used to create and manage a contact flow. In one example, a contact flow container may comprise a script body defining an initial structure of a contact flow to which contact flow components may be added. In another example, a contact flow container may comprise an application module to which contact flow components may be added.

As in block 820, the contact flow development service may receive instructions to add a contact flow component to the contact flow container. A contact flow container may include, but is not limited to, a natural language component, menu component, and action component. The contact flow components may provide functions related to providing a contact service that includes multi-turn dialogs. A computing service customer may graphically add and remove contact flow components to and from the contact flow container. Any number of contact flow components may be included in a contact flow, and may be determined based in part on the complexity of the contact service provided and the technical skill of a contact flow developer.

As in block 830, the contact flow development service may receive configurations for the contact flow components added to the contact flow container. As one example, a configuration for a natural language component may define a prompt (e.g., an audio or textual message) used to provoke a response and at least one intent identifier included in an end user spoken utterance, textual input, or physical gesture that corresponds to an action linked to the intent identifier. As another example, a configuration for a menu component may define a list of menu items available for selection by an end user. The list of menu items may be linked to corresponding actions via action components. As another example, a configuration for an action component may define a contact flow action that corresponds to an intent identifier, such as retrieving end user requested information, calling another contact flow component used to further refine an end user's intent, adding an end user to an contact service agent queue, etc.

After the contact flow has been configured to the specifications of a contact flow developer, as in block 840, the contact flow may be deployed on a managed service (e.g., a contact flow service) hosted in the computing service provider environment. In doing so, end users associated with the contact flow developer may be provided with access to the services offered through the managed service. For example, the managed service may provide end users with automated contact service that utilizes multi-turn dialogs to handle end user inquires and transactions.

Because the contact flow may be configurable using the contact flow management console, the contact flow may be modified and redeployed on a managed service according to contact flow developer needs. For example, contact flow components may be removed from the contact flow and replaced with other contact flow components. As a specific example, a menu component may be removed from the contact flow and replaced with a natural language component. The natural language component may then be configured with a prompt that asks a generalized question (e.g., "How can I help you"). The natural language component may be further configured to recognize a number of intent identifiers associated with the menu items included in the menu component that was removed, and the intent identifiers may be linked to the actions that were previously linked to the menu items. Because the contact flow can be configured using the contact flow management console and redeployed on the managed service (e.g., contact flow service) provided by a computing service provider, an application developer can modify the contact flow without having to modify an application that calls the contact flow via the managed service.

Figure 9:
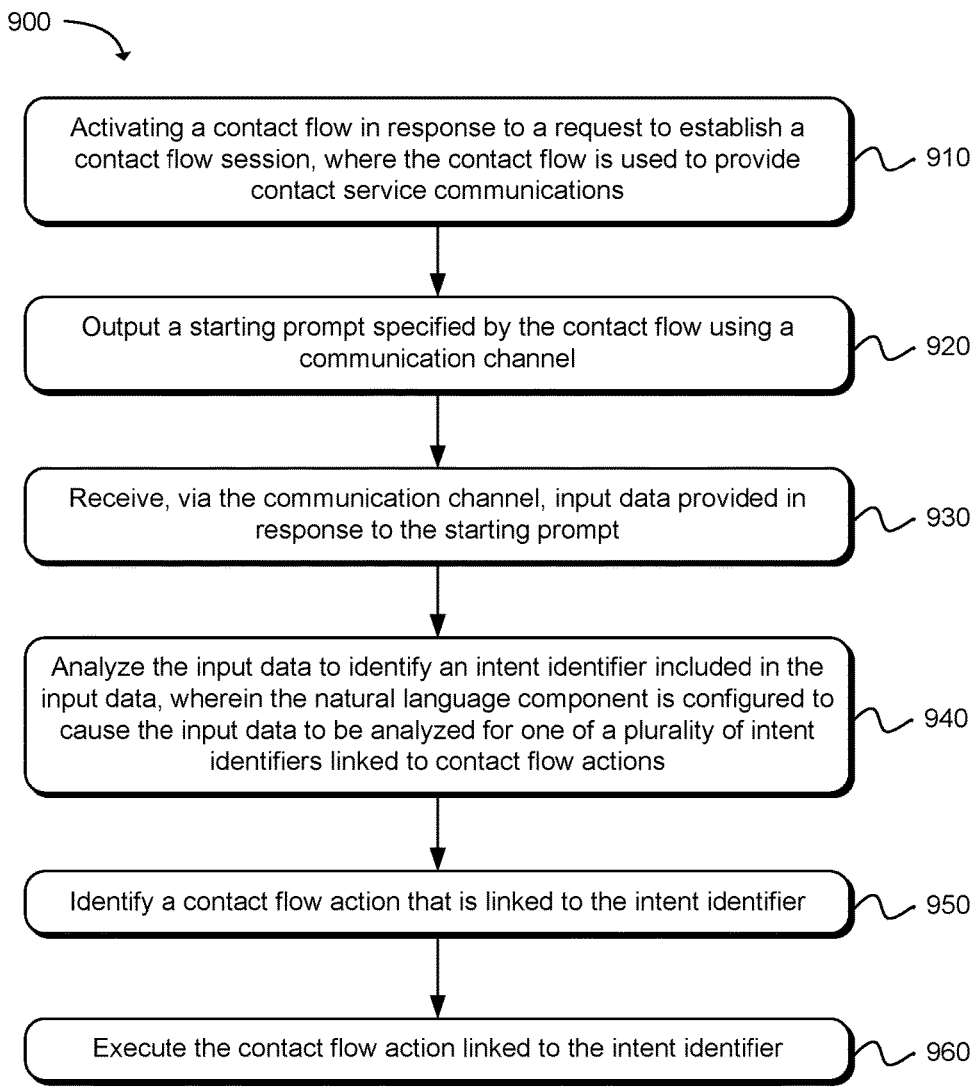
FIG. 9 is a flow diagram that illustrates an example method for implementing a contact flow developed using a contact flow development console.

FIG. 9 is a flow diagram illustrating an example method 900 for implementing a contact flow developed using a contact flow development console. As in block 910, a contact flow may be activated in response to a request to establish a contact center session. The contact flow may be used to provide automated contact service communications to end users. The contact flow may be configurable to include contact flow components used in providing the automated communications using computing resources hosted within a computing service provider environment.

As in block 920, a starting prompt specified by the contact flow may be output to an end user using a communication channel (e.g., telephony or a computer network). For example, an end user may interface with a contact flow service configured to execute the contact flow using telephony, IVR, SMS, instant message, chatbot, web page forms, email, and other forms of electronic communications.

As in block 930, input data may be received via the communication channel in response to the starting prompt. As in block 940, the input data may be analyzed to identify an intent identifier included in the input data. The natural language component may be configured to cause the input data to be analyzed for one of a plurality of intent identifiers linked to contact flow actions. Illustratively, the intent identifier may be associated with an intent to perform a contact flow action and the intent identifier may be conveyed in a spoken utterance, textual input, or an electronically represented physical gesture. In one example, the input data may be provided to a natural language engine configured to analyze the input data and determine an intent identifier contained in the input data.

As in block 950, a contact flow action linked to the intent identifier may be identified and, as in block 960, the contact flow action linked to the intent identifier may be executed. In some examples, the natural language component may be configured to provide an intermediary prompt that further refines an end user's intent. For example, a starting prompt may ask an end user in general terms what the end user would like, and the intermediary prompt may be a follow up question that further narrows what the end user would like. In some examples, the natural language component may be configured to dynamically identify an intent identifier included in input data, using for example, machine learning.

In the case that the intent identifier cannot be identified (e.g., the intent identifier may not be defined, or an end user may be unsuccessful in conveying the intent identifier), the natural language component may define an exception action that may be executed. For example, the exception action may be configured to notify an end user that an intent cannot be determined and transfer the end user to a contact center agent. As another example, the exception action may be configured to notify the end user that the intent cannot be determined and prompt the end user again to provide an intent.

Figure 10:
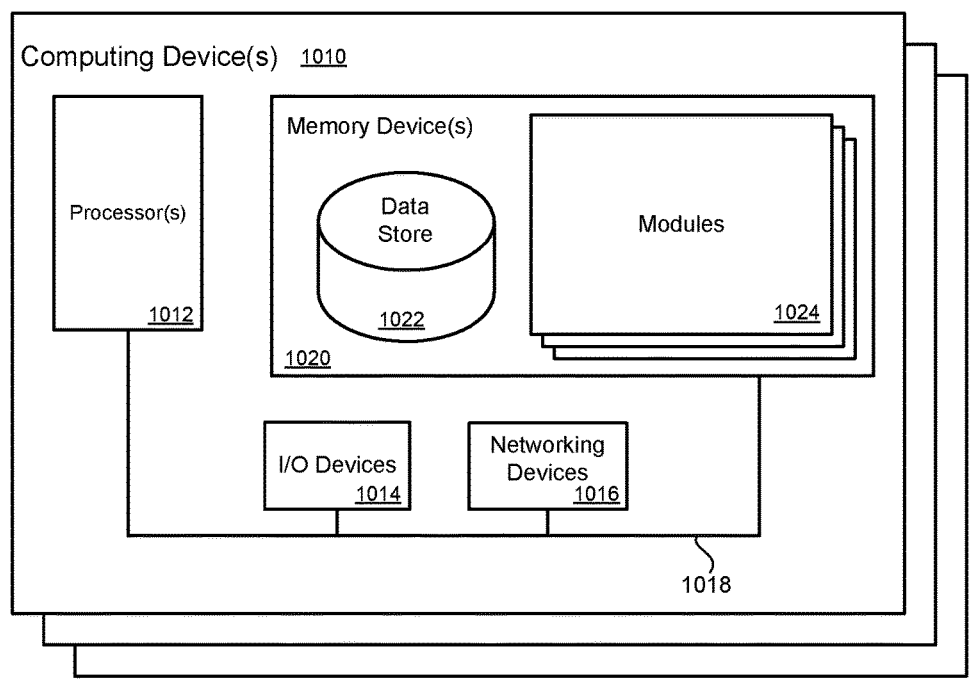
FIG. 10 is block diagram illustrating an example of a computing device that may be used to execute a method for developing a contact flow.

FIG. 10 illustrates a computing device 1010 on which services and modules of this technology may execute. A computing device 1010 is illustrated on which a high level example of the technology may be executed. The computing device 1010 may include one or more processors 1012 that are in communication with memory devices 1020. The computing device 1010 may include a local communication interface 1018 for the components in the computing device. For example, the local communication interface 1018 may be a local data bus and/or any related address or control busses as may be desired.

The memory device 1020 may contain modules 1024 that are executable by the processor(s) 1012 and data for the modules 1024. For example, the memory device 1020 may contain a contact flow development module, natural language module, machine learning module, and other modules. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor(s) 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory device 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for constructing a contact flow having at least one natural language component comprising:
   at least one processor;
   a memory device including instructions that, when executed by the at least one processor, cause the system to:
   provide a contact flow development console to a client device, wherein the contact flow development console has a contact flow container and contact flow components that are graphically configurable within the contact flow container, and the contact flow container and the contact flow components form the contact flow providing a workflow for contact service communications executed using computing resources hosted in a service provider environment;
   receive instructions from the client device to add the natural language component to the contact flow container, wherein the natural language component is configured to receive input data provided in response to a prompt configured to provoke a user response that conveys an intent identifier to have an action performed that corresponds to the intent identifier;
   receive from the client device a configuration for the natural language component defining the intent identifier and linking the intent identifier to the action; and
   provide the contact flow as the workflow in a managed service hosted in the service provider environment.

2. A system as in claim 1, wherein the intent identifier is conveyed in a spoken utterance, textual input, or a physical gesture.

3. A system as in claim 1, wherein the memory device includes instructions that, when executed by the processor, cause the system to receive a configuration for the natural language component defining an exception action that is executed when the intent identifier cannot be determined.

4. A system as in claim 1, wherein the memory device includes instructions that, when executed by the processor, cause the system to receive a configuration for the natural language component that defines the action linked to the intent identifier to execute an intermediary prompt.

5. A computer implemented method, comprising:
   activating, by a contact flow service hosted in a service provider environment, a contact flow used to provide contact service communications in response to a request to establish a contact flow session, wherein the contact flow is configurable to include contact flow components hosted in the service provider environment used in providing the contact service communications;
   outputting, by the contact flow service to a communication channel, a starting prompt specified by the contact flow;
   receiving at the contact flow service, via the communication channel, input data provided in response to the starting prompt;
   providing the input data to a natural language service to identify an intent identifier included in the input data, wherein the natural language service is configured to cause the input data to be analyzed for one of a plurality of intent identifiers linked to contact flow actions;
   identifying a contact flow action that is linked to the intent identifier; and
   executing the contact flow action linked to the intent identifier.

6. A method as in claim 5, wherein the contact flow action linked to the intent identifier outputs an intermediary prompt configured to refine a user's intent.

7. A method as in claim 5, wherein a natural language engine is used to identify the intent identifier included in the input data.

8. A method as in claim 7, wherein the natural language engine uses natural language understanding to recognize the intent identifier.

9. A method as in claim 7, further comprising receiving metadata from the natural language engine that is used to determine a flow of the contact flow.

10. A method as in claim 5, wherein machine learning is used to identify the intent identifier.

11. A method as in claim 5, wherein a compute service function is used to identify the intent identifier.

12. A method as in claim 5, further comprising:
   determining that the intent identifier cannot be identified by analyzing the input data; and
   executing an exception action that outputs an indication that the intent identifier cannot be identified.

13. A method as in claim 5, wherein the communication channel used to interact with the contact flow service includes telephony and computer networks.

14. A method as in claim 5, wherein the contact flow action retrieves information associated with the intent identifier and outputs the information to the communication channel.

15. A method as in claim 5, wherein the action connects a user with an agent.

16. A method as in claim 5, further comprising scaling the computing resources hosted within the computing service provider environment according to a user demand for the contact flow.

17. A method as in claim 5, further comprising:
   collecting transaction data associated with the contact flow; and
   analyzing the transaction data to identify changes to the contact flow.

18. A non-transitory machine readable storage medium having instructions embodied thereon, the instructions when executed by a processor:
   load a contact flow into a contact flow development interface, wherein the contact flow is represented in the contact flow development interface using a contact flow container and contact flow components that are configurable, and the contact flow is used to provide contact service communications;
   receive instructions to add a natural language component to the contact flow, wherein the natural language component is configured to receive input data generated in response to a prompt and cause the input data to be analyzed for an intent identifier that is linked to a contact flow action;
   receive a configuration for the natural language component defining intent identifiers linked to contact flow actions that are handled by the natural language component; and
   provide the contact flow in a managed service hosted in a computing service provider environment.

19. A non-transitory machine readable storage medium as in claim 18, wherein the instructions that when executed by the processor further receive instructions to update the contact flow by:
   removing a first contact flow component from the contact flow; and
   replacing the first contact flow component with a second contact flow component.

20. A non-transitory machine readable storage medium as in claim 18, wherein the instructions that when executed by the processor further receive instructions to update properties of a contact flow component included in the contact flow.

\* \* \* \* \*